United States Patent [19]

Haynes

[11] 4,421,171

[45] Dec. 20, 1983

[54] VALVE OPERABLE UNDER OPPOSITELY DIRECTED PRESSURE DIFFERENTIALS

[75] Inventor: Andrew Haynes, Missouri City, Tex.

[73] Assignee: Baker International Corporation, Orange, Calif.

[21] Appl. No.: 265,866

[22] Filed: May 21, 1981

[51] Int. Cl.³ .............................................. E21B 34/12
[52] U.S. Cl. .................................. 166/331; 166/330; 251/58
[58] Field of Search ............... 166/330, 331, 332, 333, 166/334; 251/58, 229

[56] References Cited

U.S. PATENT DOCUMENTS

| 3,233,677 | 2/1966 | Myers | 166/330 |
|---|---|---|---|
| 3,509,913 | 5/1970 | Lewis | 137/614.11 |
| 3,821,962 | 7/1974 | Mott | 166/332 |
| 4,022,427 | 5/1977 | Read | 166/330 |
| 4,130,166 | 12/1978 | Akkermann et al. | 166/330 |
| 4,210,207 | 7/1980 | McStravick et al. | 166/330 |
| 4,319,634 | 3/1982 | McMahan et al. | 166/250 |

Primary Examiner—Stephen J. Novosad
Assistant Examiner—William P. Neuder
Attorney, Agent, or Firm—Norvell & Associates

[57] ABSTRACT

A valve is provided for use in a subterranean well. Rotary manipulation of a fluid transmission conduit results in rotation of a ball valve to selectively open and close the fluid conduit. Rotary manipulation of the fluid conduit is imparted to the ball valve by means of a lever assembly which transfers sufficient force for activation of the valve permitting the valve to be used in the presence of significant pressure differentials. Seals are provided on opposite sides of the ball valve to prevent communication of either fluid or pressure from either above or below the ball valve.

17 Claims, 9 Drawing Figures

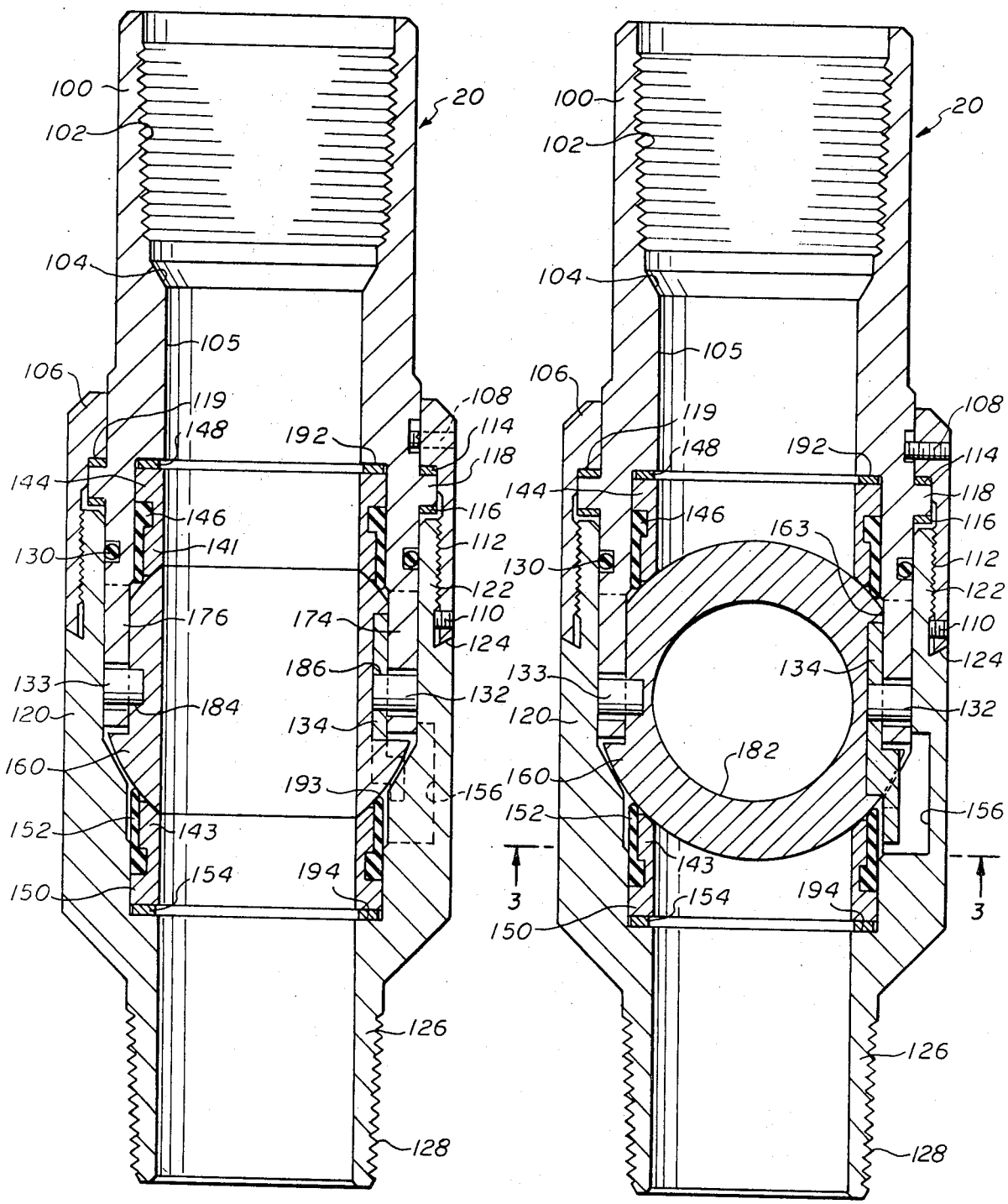

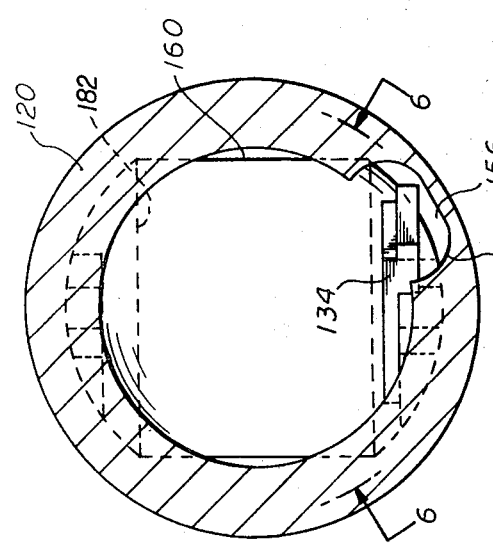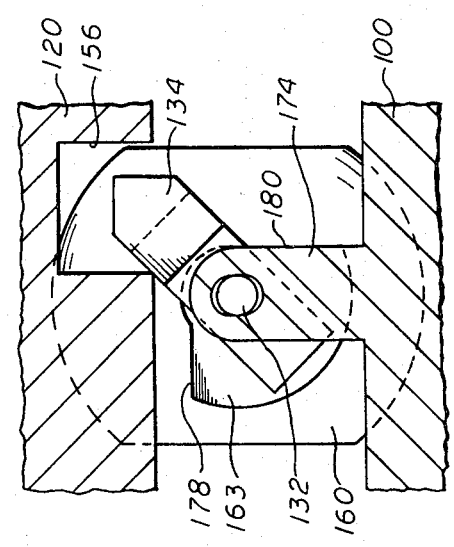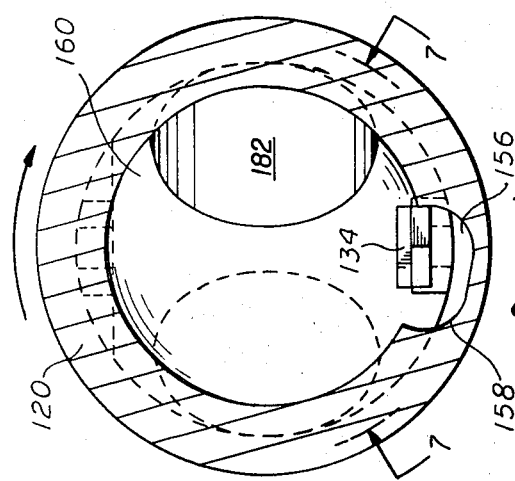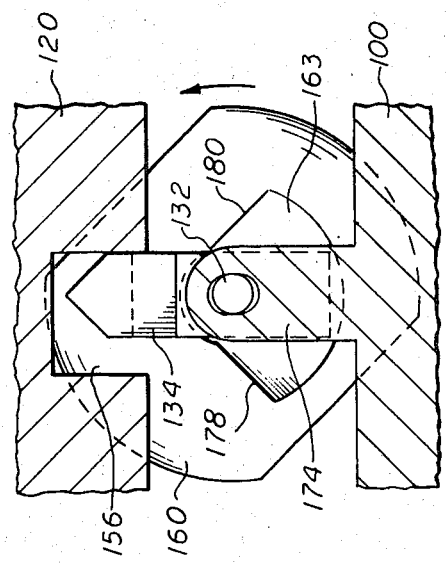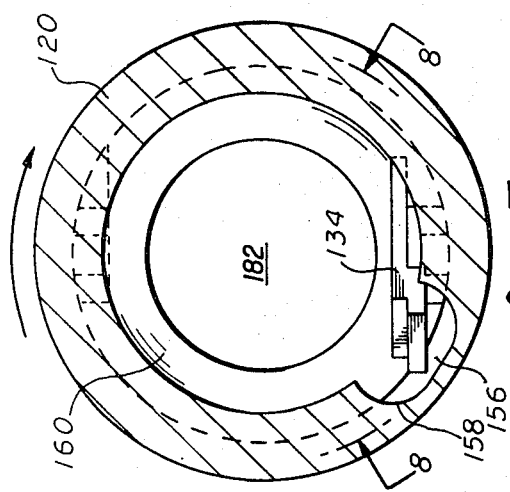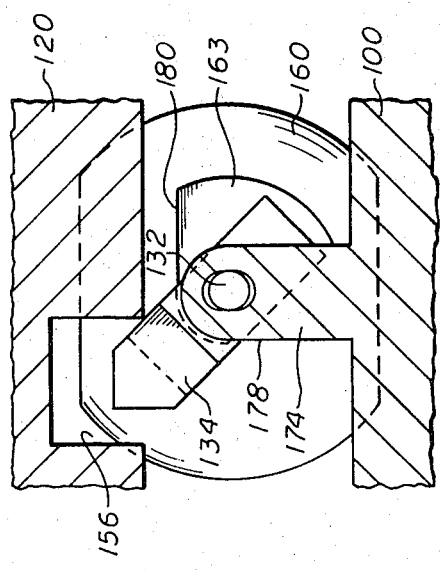

VALVE OPERABLE UNDER OPPOSITELY DIRECTED PRESSURE DIFFERENTIALS

BACKGROUND OF THE INVENTION

1. Field of the Invention

The invention relates to a valve apparatus which may be utilized in a fluid transmission conduit of a subterranean well to isolate fluid flow passing therethrough.

2. Description of the Prior Art

It is frequently necessary to isolate the flow of fluids within a fluid transmission conduit, such as a tubing string in a subterranean well. The prior art is familiar with many varied designs of the valves, particularly "safety" valves that utilize a ball having a flow passageway therethrough as the valve head. Such valves have been found to be particularly reliable in subterranean well applications.

One type ball valve utilizing a cam action to manipulate the valve is disclosed in U.S. Pat. No. 4,210,207. That valve apparatus was responsive to rotational manipulation of the fluid transmission conduit which permitted the valve to be activated before and/or after the setting or release of another tool, such as a packer, bridge plug or the like. Other prior art ball valves have utilized camway slots defined on the exterior of or relative to the seat of the valve in response to hydraulic activation through the incorporation of piston means. Valves incorporating other actuating means are also known in the art.

Prior art mechanical ball valves may be difficult to activate in the presence of a pressure differential existing across the valve. Such pressure differentials may result from the presence of excessive pressure existing either above or below the ball valve apparatus. Mechanically activated valves in the presence of large pressure differentials often resist mechanical rotation. The present invention provides a valve apparatus which not only enables rotational manipulation and pivoting of the ball valve utilizing less torque than previously required, but also provides continuous seals to isolate pressure differentials when the valve is in the closed position.

SUMMARY OF THE INVENTION

A valve apparatus utilizing rotary manipulation of a fluid transmission conduit to selectively restrict flow through the conduit is provided by this invention. The valve apparatus comprises mutually rotatable housing or sub members. A ball valve which rotates with respect to each housing member about a transverse axis is mounted on one housing member and a lever arm assembly transmits the force imparted by relative rotation of the other housing member to the ball. A flow passage extending through the ball valve may then be selectively aligned with the bore of the fluid transmission conduit. The lever is mounted on the same axis of rotation as the ball valve thus permitting oppositely facing seal assemblies above and below the ball valve to remain in generally constant contact with the periphery of the ball valve.

CROSS REFERENCE

The disclosure of this application is related to the disclosure in my co-pending applications, *METHOD AND APPARATUS FOR SELECTIVE DISENGAGEMENT OF A FLUID TRANSMISSION CONDUIT OPERABLE UNDER OPPOSITELY DIRECTED PRESSURE DIFFERENTIALS*, Ser. No. 265,725, and *METHOD OF TESTING A FLUID TRANSMISSION CONDUIT IN A SUBTERRANEAN WELL*, Ser. No. 265,870, filed concurrently herewith.

BRIEF DESCRIPTION OF THE DRAWINGS

FIG. 1 is a sectional view of the valve apparatus in the open position.

FIG. 2 is a sectional view of the valve apparatus in the closed position.

FIG. 3 is a cross-sectional view taken along lines 3—3 of FIG. 2 showing the valve in the closed position.

FIG. 4 is a cross-sectional view similar to that of FIG. 3 showing the valve at an intermediate position.

FIG. 5 is a cross-sectional view similar to that of FIG. 3 and for showing the valve in the closed position.

FIG. 6 is a sectional view taken along lines 6—6 in FIG. 3 showing the position of the lever arm when the valve is in the closed position.

FIG. 7 is a sectional view taken along lines in FIG. 4 and similar to that of FIG. 6 showing the lever arm when the valve is in the intermediate position.

FIG. 8 is a sectional view taken along lines FIG. 5 showing the completion of the relative movement between the housing recess and the lever arm as the valve is in the closed position.

DESCRIPTION OF THE PREFERRED EMBODIMENTS

Figure 9:
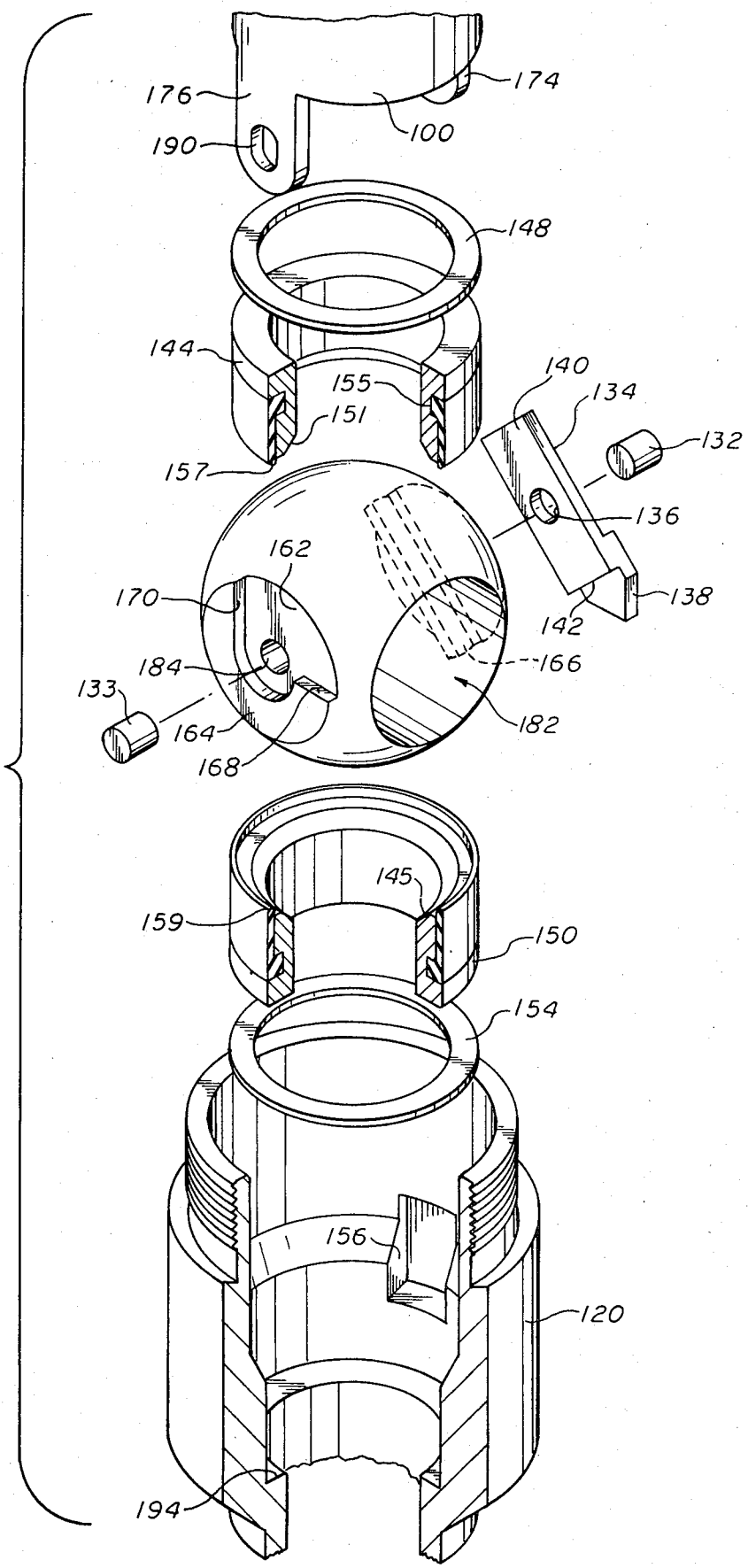
FIG. 9 is an exploded perspective showing the principal component parts of the valve assembly.

The preferred embodiment of this invention generally comprises a top sub or housing member 100 aligned along the axis of a fluid transmission conduit (not shown) with a bottom sub or housing member 120. Each sub or housing member has a central bore which, when mounted on a fluid transmission conduit, will be axially aligned with the bore of the fluid transmission conduit. A spherical ball valve 160 is internally mounted on the top sub or housing member 100 and is free to rotate about an axis transverse to, and in this embodiment perpendicular to the axis of the housing members and the fluid transmission conduit. Ball valve 160 has a central flow passage 182 which may be selectively aligned with the bores of the housing members upon mutual rotation between the top sub or housing member 100 and bottom sub or housing member 120. A lever 134 is provided to transfer the axial rotation of the fluid conduit and the sub or housing members to the ball valve.

FIGS. 1 and 2 are sectional views depicting the valve which may be inserted at an appropriate position in a tubing string. Appropriate threaded connections 102 and 128 are provided above and below the operating ball valve head 160. Tubing (not shown) would extend both above and below the valve apparatus as illustrated by the preferred embodiment of this invention. On the upper end of the preferred embodiment of this valve apparatus is a top sub housing member 100 having internal threads 102 adjacent its upper end. A sloping or beveled shoulder 104 extends inwardly from the lower end of threads 102 to the cylindrical bore surface 105 which defines the inner diameter of the conduit through the valve apparatus. Top sub housing member 100 extends downwardly and terminates on opposite sides of the ball valve head apparatus 160. On the lower end of top sub housing member 100 are two opposite support brackets 174 and 176 upon which ball valve head 160 is mounted.

The lower section of this valve apparatus is defined by a housing member 120 extending below top sub housing member 102 and encircling brackets 174 and 176. Top sub housing member 100 and housing member 120 are longitudinally held in position by a cap member 106. Cap member 106 engages housing 120 by means of a threaded connection 112 located along the upper extremities of housing member 120. A shear screw 108 positions cap member 106 with respect to top sub member 100. A screw screw 110 located at the bottom of cap member 106 prevents disengagement of the threaded connection 112 between cap member 106 and housing 120. Although top sub member 100 and housing 120 are longitudinally connected only shear screw 108 prevents rotation of housing 120 with respect to top sub 100 about the axis of the fluid transmission conduit of the tubing and the valve apparatus. An outwardly extending bearing element 118 encircles top sub housing member 100 and engages a mating recess 119 in cap member 106. Bearing surfaces 114 and 116 between element 118 and a recess 119 carry any axial load during rotation of cap member 100 with respect to housing 120. An O-ring seal 130 encircles top sub housing member 100 between the mating faces of top sub housing member 100 and housing member 120 to prevent fluid communication or pressure leakage along these mating surfaces.

Ball valve head 160, as shown in FIG. 9, generally comprises a spherical element having a central cylindrical flow passage 182 extending therethrough. Ball valve 160 has generally circular recesses 184 and 186 diametrically opposed and each capable of receiving a cylindrical pin 132 or 133. Pivot recesses 184 and 186 are positioned along an axis generally extending perpendicular or transversely to the axis of rotation of cylindrical flow passage 182. The spherical portion of ball valve head 160 terminates along mating face 164 as best shown in FIG. 9. Planar face 164 terminates along transversely inwardly extending shoulders 168 and 170 which, in turn, terminate in a planar surface 162 generally parallel to the plane of face 164. Planar surface 162 intersects the spherical ball valve head 160 along a plane closer to the center of the spherical element than surface 164. A planar surface 163 similar to surface 162 is located on the opposite side of ball valve 160 in the vicinity of the diametrically opposed pivot retaining recess 186. The opposite surface does differ in one respect from the surfaces shown most clearly in FIG. 9. A generally rectilinear cavity 166 intersecting the apex of stop shoulders generally equivalent to 168 and 170 is located along this oppositely facing surface. This cavity 166 is shown by the dotted lines in FIG. 9.

Ball valve 160 is mounted in the valve apparatus on two pivot pins 132 and 133. These pivot pins extend through hole 188 and 190 in ball support brackets 174 and 176 located on the top sub 100. A lever arm or moment arm 134 is located adjacent to one of the two mating faces of ball valve 160. Lever arm 134 is mounted on pivot pin 132 generally between ball valve 160 and portions of the bracket members of the top sub 100 and upper portions of housing 120. Lever arm 134 has a generally rectilinear base member 140 which is received by a rectilinear valve arm groove 166. Lever arm 134 has an integral mating end 138 which in the preferred embodiment has inclined surfaces which meet to form an arrow configuration. Mating end 138 is offset from the lever arm base 140 forming offset shoulder 142, as illustrated in FIG. 9. Pivot pin 132 extends through a hole 136 in lever arm base 140 and thence into an appropriate hole along one mating face of ball valve 160. The inclined surfaces 139 of lever arm mating end 138 are preferably somewhat convex, as best illustrated in FIG. 4.

When viewed in FIGS. 1 and 2, it is apparent that housing 120 has a concave surface 193 along its inner surface to enable partial receipt of ball valve 160. Along one portion of the inner surface of housing 120, in the immediate vicinity of concave surface 193, an oppositely facing offset concave cavity 156 is formed in housing 120. This concave cavity is formed about an axis parallel to the axis of the bore of the valve apparatus, as can best be seen in FIGS. 3, 4 and 5. When ball valve 160 is mounted on support brackets 174 and 176 the offset mating end 138 of lever arm 134 is received in concave cavity 156. In this position, both cavity 156 and the mating surfaces or mating portion of lever arm 134 are spaced from the axis of rotation formed by pivot pins 132 and 133. A convex surface of lever arm mating end 138 abuts a concave portion of housing cavity 156, as can best be seen in FIG. 4. These mating concave and convex surfaces provide a greater area of contact than would otherwise be available if the convex surface were planar.

The central portion of the housing bore of this valve apparatus in the vicinity of ball valve 160 is enlarged and is formed by offset shoulder 192 and 194, as illustrated in FIGS. 1 and 9. Offset shoulder 192 is located on top sub member 100 and offset shoulder 194 is located on housing 120, but the shoulders are otherwise identical and establish a generally smooth right circular cylindrical bore for receiving ball valve 160, its actuating mechanisms, and seals for use with ball valve 160. As can be seen in FIG. 1, spring members 154 can be located in abutting relation with both shoulders 192 and 194. In the preferred embodiment of this invention, Belleville washers 148 and 154 are located, respectively, on shoulders 192 and 194. Belleville washers 148 and 154 will then exert forces inwardly directed toward each other against any assembly mounted between shoulders 192 and 194. Seal assemblies 141 and 143 are shown in position against Belleville washers 148 and 154 and ball valve head in FIG. 1. Belleville washers 148 and 154 can then exert an inwardly directed force against seal assemblies 141 and 143. Each seal assembly shown in the preferred embodiment of this invention comprises two separate sealing elements. Both upper and lower metal sealing elements 144 and 150 are of similar construction.

It is apparent that each metallic seal 144 and 150 is generally formed as a ring member having a flat base and an inclined mating or seating face 151. Intermediate the upper and lower ends of upper seal element 144, a groove 155 completely encircles the metallic seal element on its outer surface. Elastomeric seal members 146 and 152 can be mounted on the exterior of metallic sealing or seating elements 144 and 150. These elastomeric sealing members can be formed of any number of elastomeric materials which can be used to form a seal in a subterranean conduit. Each elastomeric seal element has an inner mating edge 157 and 159 along the edge immediately adjacent sealing or seating faces 151 and 145. As can be seen in FIGS. 1 and 2, the elastomeric sealing element and the metallic sealing or seating members both engage the exterior of spherical valve head means 160. It should be noted that the diameters of the metallic sealing or seating members 144 and 150 and the elastomeric sealing elements 146 and 152 are each greater than the inner diameter of the cylindrical flow passage 182 in ball valve 160. This construction enables the seating or sealing faces of the metallic seals and the sealing edge of the elastomeric seals to be in continuous contact with the exterior of the ball valve.

OPERATION

The valve depicted in the preferred embodiment of this invention could typically be operated in conjunction with additional tubing string elements, such as a packer. After a packer, not shown but of conventional construction, has been set to anchor the tubing string to the casing of a subterranean well, the ball valve apparatus depicted in this invention could then be operated by simple rotational manipulation of the tubing string. The ball valve apparatus shown in this invention would typically be fixed in a partially open configuration during running in of the tubing into the well. This partially open configuration or 45° configuration is shown in FIG. 4. By positioning the valve in this manner, the tubing string could be lowered into the well and the build up of pressures below or above the valve could be avoided during insertion. During the initial run in of the tubing, ball valve head 160 is held in the partially open or 45° position by means of set screw 108 which prevents top sub housing member 100 and the ball valve from rotating with respect to the tubing. When the tubing is in the desired position and has been anchored to the casing by means of a conventional packer, the valve apparatus can be freed for normal operation by rotating the tubing string extending above the ball valve. If lower housing 120 is affixed to a section of tubing (not shown) which is not free to rotate, right hand rotation of the upper tubing string (not shown) will cause ball valve 160 to move from the partially open configuration of FIG. 4 to the fully open configuration of FIG. 5. In order to allow such rotary activation of top sub housing member 100 and rotation of ball valve 160, top sub housing member 100 must be freed by the application of sufficient torque to shear set screw 108. The upper tubing and top sub 100 are now free to rotate with respect to the lower housing 120 through an angle of 90° in the preferred embodiment. Assuming ball valve 160 is in the position shown by FIG. 3, right hand rotation of the upper tubing will cause the ball valve 160 to move through immediate positions illustrated by the 45° configuration of FIG. 4 to the fully open configuration of FIG. 5.

In FIG. 6, it is apparent that bracket members 174 and 176 abut shoulder 180 on the ball valve when the valve is in the completely closed position. As the tubing string moves through an angle of 90°, the ball will also rotate about a separate transverse or perpendicular axis through an angle of 90° until the opposite offset shoulder 178 abuts the opposite surface of one of the bracket members 174 and 176. Rotation of ball valve 160 about an axis perpendicular to the tubing string is imparted by means of the moment induced about the pivoting axis of the ball through lever arm 134. As top sub housing member 100 moves rotationally with respect to stationary lower housing 120, the surface defining lever actuating cavity 156 transmits a force to the mating end of lever 134. This force is transferred about a fulcrum defined by pivot pins 132 and 133 and thence to the spherical ball valve 160. The opposite end of lever arm 134 is retained in cavity 156 and the lever arm is not free to rotate with respect to the ball. The surface defining cavity 156 is adjacent to cylindrical seal assembly 143 and its relative movement is along a circular path with a diameter greater than the outer diameter of the cylindrical seal assembly. The mating end of lever 134 is offset to properly engage this surface. A sufficient moment is therefore transferred to the ball to enable relatively easy activation of the ball even in the presence of relatively high differential pressures. A convex surface formed on lever arm mating end 138 does enable the transmission of greater force to the ball valve then could be obtained if a planar surface were utilized. If a planar surface is utilized, a smaller area will contact the inner concave surfaces or recess or cavity 158 generating higher pressures and effectively decreasing the force which could be imparted to the lever arm. This invention permits the activation of the valve with the application of less force than might otherwise be required.

Although the invention has been described in terms of the specified embodiment which is set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A valve apparatus for use in a subterranean well and carriable on a fluid transmission conduit insertable therein, said valve apparatus being responsive to axial rotational manipulation of said fluid transmission conduit; said valve apparatus having first and second mutually rotatable housing members having axially aligned bores; ball valve head means mounted on said first housing member and having a cylindrical flow passage extending therethrough; pivot means for mounting said ball valve head means on said first housing member with said ball valve head means being free to rotate with respect to said first housing member; and lever means mounted on said pivot means with said pivot means comprising the fulcrum for said lever means, said lever means having first and second ends axially spaced apart, said first end engaging said ball valve head means immediate said first housing member on one side of said pivot means, said second end of said lever means engaging said second housing member on the other side of said pivot means immediate said second housing; rotation being transferred to said ball valve head means during rotation of said first and second housing members.

2. The apparatus of claim 1 wherein an offset cavity means communicates with and is offset from the bore in said second housing member, said second end of said lever means being received within said offset cavity means and abutting said second housing member.

3. The apparatus of claim 1 wherein said cavity means is defined by a concave surface.

4. The apparatus of claim 1 wherein said second end of said lever means is offset with respect to said first end.

5. The apparatus of claim 1 wherein said ball valve head means further comprises a rectilinear cavity means immediate said pivot means, said first end of said lever means being received within said rectilinear cavity means, said first end of said lever means being fixed with respect to said ball valve head means during rotation of said ball valve head means.

6. The apparatus of claims 1, 2, 3, 4 or 5 wherein said ball valve head means and said lever means rotate about an axis transverse to said axially aligned bores.

7. The apparatus of claims 1, 2, 3, 4, 5 or 6 wherein a first annular seal is mounted in said first housing member; a first resilient means urging said first annular seal into sealing engagement with said ball valve head means; a second annular seal mounted in said second housing member; and a second resilient means for urging said second annular sealing into sealing engagement with said ball valve head means; whereby fluid seals are maintained between said first and second housing members and said ball valve head means throughout any relative rotation of said first and second housing members.

8. A valve apparatus for use in a subterranean well and carriable on a fluid transmission conduit insertable therein and responsive to axial rotation of said fluid transmission conduit; said valve apparatus comprising first and second mutually axiably rotatable housing members having axially aligned bores; ball valve head means mounted on said first housing member; first seal means contacting said ball valve head means for establishing sealing integrity between said ball valve head means and said first housing member and second seal means for establishing sealing integrity between said ball valve head means and said second housing means; lever means for rotating said ball valve head means as said first housing means rotate with respect to said second housing means, said lever means having first and second spaced apart ends, said first end engaging said ball valve head means and said second means engaging a surface on said second housing member adjacent to said second cylindrical seal means.

9. The valve apparatus of claim 8 wherein said lever means and said ball valve head means pivot about the same axis transverse to the axis of rotation of said first and second housing members.

10. The valve apparatus of claim 9 wherein said second seal means is located between the bore in said second housing member and said surface on said second housing member engaging said second end of said lever means.

11. The valve apparatus of claim 10 wherein said first end of said lever means engages said ball valve head means between said transverse axis of rotation of said ball valve head means and said first seal means.

12. The apparatus of claim 8 wherein said first and second seal means are biased toward said ball valve head means.

13. The apparatus of claim 8 wherein said first and second seal means each comprise cylindrical elastomeric seal means generally encircling cylindrical metallic seal means.

14. The apparatus of claim 8 wherein said first and second seal means remain in contact with said ball valve head means during rotation of said ball valve head means.

15. The apparatus of claim 8 wherein said first and second seal means remain generally longitudinally fixed with respect to said first and second housing members and with respect to said ball valve head means.

16. A valve apparatus for use in a subterranean well and carriable on a fluid transmission conduit insertable therein, said valve apparatus being responsive to axial rotational manipulation of said fluid transmission conduit; said valve apparatus having first and second mutually rotatable housing members; having axially aligned bores; ball valve head means mounted on said first housing member and having a cylindrical flow passage extending therethrough; pivot means for mounting said ball valve head means on said first housing member with said ball valve head means being free to rotate with respect to said first housing member; lever means mounted on said pivot means with said pivot means comprising the fulcrum for said lever means, said lever means having first and second ends axially spaced apart, said first end engaging said ball valve head means immediate said first housing member on one side of said pivot means, said second end of said lever means engaging said second housing member on the other side of said pivot means immediate said second housing, and first seal means for establishing sealing integrity between said ball valve head means and said first housing member and second seal means for establishing sealing integrity between said ball valve head means and said second housing member rotation being transferred to said ball valve head means during rotation of said first and second housing member.

17. A valve apparatus for use in a subterranean well and carriable on a fluid transmission conduit insertable therein and responsive to axial rotation of said fluid transmission conduit, said valve apparatus comprising: mutually rotatable first and second housing members having axially aligned bores; ball valve head means comprising a generally spherical member having an outer diameter larger than the inner diameter of said axially aligned bores and pivotally mounted on said first housing member; a cylindrical flow passage extending through said ball valve head means having an inner diameter substantially equivalent to said axially aligned bores; cylindrical seal means in contact with the periphery of said ball valve head means for establishing sealing integrity between said ball valve head means and said second housing member and having an inner diameter equal to or greater than the inner diameter of said cylindrical flow passage and an outer diameter less than the outer diameter of said ball valve head means; a surface on said second housing member immediate said cylindrical seal means, said surface generally relatively movable along a circular path with a diameter greater than the outer diameter of said cylindrical seal means; and lever means having spaced apart first and second ends, said first end engaging said ball valve head means and second end engaging said surface to transmit the rotation of said second housing about a fulcrum to said ball valve head means with said cylindrical seal means remaining in contact with the periphery of said ball valve head means.

* * * * *